United States Patent [19]

Fardell

[11] Patent Number: 5,391,029
[45] Date of Patent: Feb. 21, 1995

[54] FASTENING NAIL

[75] Inventor: Emanuel S. Fardell, Glen Haven, Australia

[73] Assignee: W. A. Deutsher Pty. Ltd., Moorabbin, Australia

[21] Appl. No.: 82,567

[22] Filed: Jun. 28, 1993

[51] Int. Cl.6 .............................................. F16B 15/08
[52] U.S. Cl. ..................... 411/451; 411/452; 411/455; 411/496
[58] Field of Search ............... 411/440, 452–455, 411/494, 496, 497, 394, 451

[56] References Cited

U.S. PATENT DOCUMENTS

| | | | |
|---|---|---|---|
| 395,898 | 1/1889 | Harvey | 411/496 |
| 519,810 | 5/1894 | Floyd | 411/452 |
| 2,650,032 | 8/1953 | Godfrey | 411/455 X |
| 3,106,791 | 10/1963 | Ball | 411/452 X |
| 3,156,152 | 11/1964 | Reed | 411/394 X |
| 3,850,073 | 11/1974 | Hayes | 411/453 |
| 3,921,496 | 11/1975 | Helderman | 411/455 X |
| 3,977,142 | 8/1976 | Dove et al. | 411/454 X |
| 4,846,655 | 7/1989 | Gulley | 411/455 X |
| 4,932,820 | 6/1990 | Schniedermeier | 411/455 |

Primary Examiner—Neill R. Wilson
Attorney, Agent, or Firm—Schwartz & Weinrieb

[57] ABSTRACT

A nail having an elongate shank, a head at one end of the shank and a tip portion at the other end. A lateral step is formed in the shank at a location spaced from both the head and the tip so as to divide the shank into a relatively small diameter penetrating portion which is adjacent the tip, and a relatively large diameter gripping portion which is adjacent the head. Any of a variety of gripping features, such as ribs or teeth, could be provided on the gripping portion to assist its grip within a member to which the nail is to be secured.

26 Claims, 4 Drawing Sheets

FASTENING NAIL

FIELD OF THE INVENTION

This invention relates to nails for fastening one member to another, and is particularly although not exclusively concerned with fastening sheet or plank cladding to a support. A nail according to the invention is especially suited for fastening cladding to a steel or other metal support, and it will be convenient to hereinafter describe the invention with particular reference to that type of application. It is to be understood however, that a nail in accordance with the invention can be used in other applications.

Reference in this specification to "cladding" is to be understood as embracing any sheet or plank material suitable for forming internal or external linings for walls or other structures. Examples of such materials are timber, plaster-board and HARDI-PLANK (Trade Mark), but this is not an exhaustive list of examples of applicable materials.

BACKGROUND OF THE INVENTION

Cladding is commonly fastened to a metal frame by means of screws because of the ability of screws to firmly grip within the metal frame. Screws of the self-drilling type are generally used because of their convenience, but they are relatively expensive. Nails have not been thought to be appropriate for securing cladding to a metal frame because of their relatively low pull-out resistance when driven through a hard material.

OBJECTS OF THE INVENTION

It is an object of the present invention to provide a nail which grips firmly within a Lard material, such as metal, into which it is driven. It is a further object of the invention to provide such a nail which is suited for use with a power driven tool such as a pneumatic, gas, electric or powder operated driving tool. It is to be understood however, that the nail could be used with other types of power driven tools.

SUMMARY OF THE INVENTION

When a nail is driven through a member, the hole thereby formed in that member results from rupture and/or resilient distortion of that part of the member containing the hole. In the case of a member composed of relatively soft material, the hole forming mechanism is predominantly resilient distortion of the material, and consequently the material surrounding the hole tends to press back against the shank of the nail to provide a firm grip on the nail. In the case of a member composed of a relatively hard material, the hole forming mechanism is predominantly rupture of the material, and that may result in a hole larger than the shank of the nail which formed the hole. At least, there is minimum tendency for the material surrounding the hole to move back against the nail shank.

A nail according to the present invention overcomes the aforementioned difficulty by having a stepped shank. That is, the shank has a penetrating portion which is remote from the head of the nail and a gripping portion which is between the head and the penetrating portion and which has a cross-sectional size greater than that of the penetrating portion. The arrangement is such that the penetrating portion creates a hole within the member into which the nail is driven, and the gripping portion is subsequently forced into that preformed hole to grip firmly with the member. The hole is enlarged as the gripping portion is driven into it, but the material distortion necessary for that enlargement is not significant, and as a consequence results predominantly from resilient deformation rather than rupture.

It is generally preferred that the nail has a pointed or otherwise formed tip portion which facilitates initial penetration of the nail into a member.

BRIEF DESCRIPTION OF THE DRAWINGS

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention. In the drawings, like reference characters designate like or corresponding parts throughout the several views, and.

DETAILED DESCRIPTION

The nail shown in FIGS. 1 to 5 of the drawings has a shank 1 and a head 2, which in the example shown is formed with a flat side 3 so as to be adapted for use in the cartridge system of a powered driving tool. The invention is applicable to nails which are not so adapted and which have heads of a form different to that shown.

In particular, the invention is applicable to nails having heads other than flat sided heads.

Figure 1:
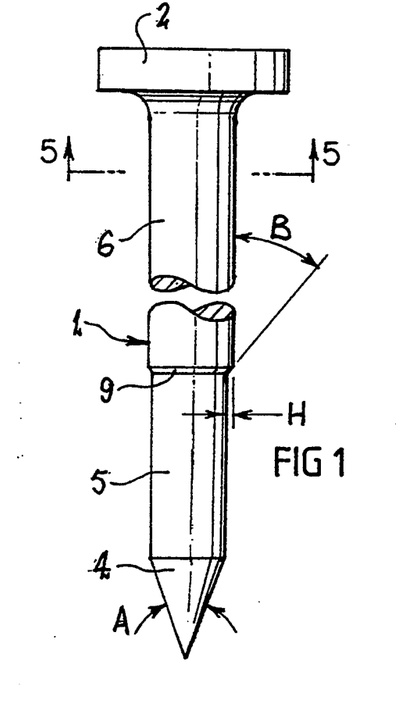
FIG. 1 is a side elevation view of a nail according to one embodiment of the invention.
Figure 2:
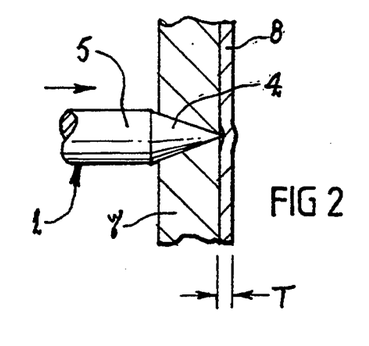
FIG. 2 is a view showing the tip portion of the nail of FIG. 1 penetrating cladding to be attached to a support.

In the particular example shown, the shank 1 is generally cylindrical and has three portions, a tip portion 4, a penetrating portion 5, and a gripping portion 6. The tip portion 4 is of pointed conical form, and although that has been found to be a most satisfactory form, other forms such as diamond or chisel points may also be used. A conical form is generally preferred because it exhibits little tendency to shear the material through which it is driven, whereas diamond and chisel points are generally less satisfactory in that regard. Also, a conical point exhibits less tendency to be deflected laterally when it first strikes the surface of the member into which it is to be driven.

Tests have indicated that use of a conical tip portion form rather than one of diamond or chisel form, results in approximately 15% improvement in nail grip. A particularly satisfactory conical tip has an included angle A (FIG. 1) within the range 30° to 40° inclusive, and an angle of 35°, or thereabouts, is preferred. It is nevertheless possible to achieve acceptable results with an angle in the range 25° to 120°. The same range of included angles is applicable to both diamond and chisel points, and any other point configuration which may be adopted.

Figure 3:
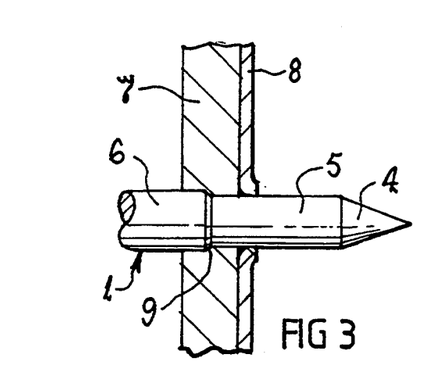
FIG. 3 is a view similar to FIG. 2 but showing the nail extending through both the cladding and the support.
Figure 4:
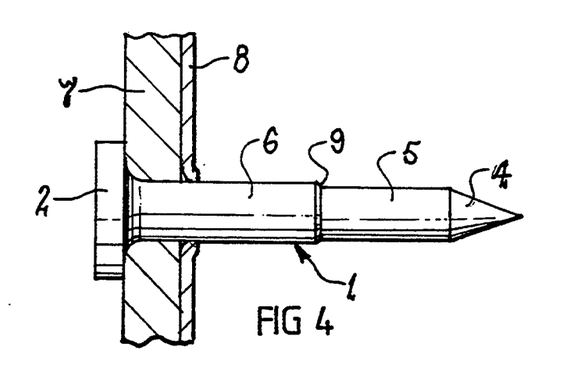
FIG. 4 is a view similar to FIG. 3 but showing the nail fully driven through the cladding and support so as to hold the cladding against the support.
Figure 5:
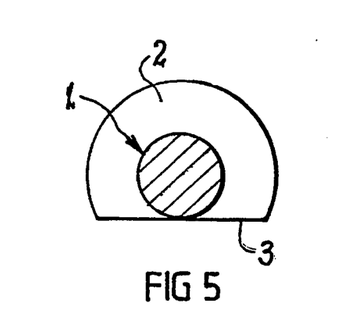
FIG. 5 is a cross-sectional view taken along line 5—5 of FIG. 1.

The penetrating portion 5 of the shank 1 is immediately adjacent the tip portion 4, and the length of the portion 5 can be selected to suit requirements. That length is preferably such that in the case of attachment of cladding 7 to a metal frame (FIGS. 2 to 4), the penetrating portion 5 passes completely through the frame member 8 before the gripping portion 6 engages that member (FIG. 3). Stated another way, the length of the penetrating portion 5 is prefereably no less than the thickness of the member 8 through which it is to pass and within which the gripping portion 6 is intended to grip.

Figure 15:
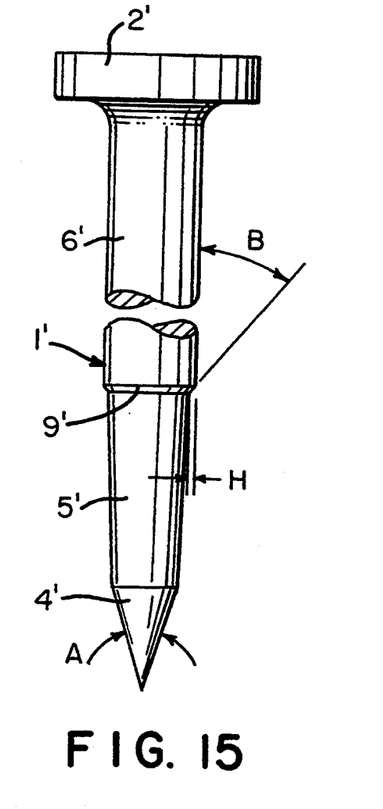
FIG. 15 is a view similar to that of FIG. 1, showing however an additional embodiment wherein the different component parts of the nail are denoted by primed (') reference characters.

It is also preferred that the penetrating portion 5 is of substantially constant cross-sectional size throughout its length, however, it could be slightly tapered as shown in FIG. 15.

The gripping portion 6 has a diameter larger than that of the penetrating portion 5, and is selected to achieve the required result—namely, a firm grip within the member 8. It is generally preferred to adopt a particular relationship between the thickness (T) of the member 8 and the height (H) of the step 9 formed between the two shank portions 5 and 6 (see FIGS. 1 and 2). Satisfactory results have been achieved with a difference in diameter between the gripping portion 6 and the penetrating portion 5 which is roughly equivalent to the thickness (T) of the member 8. It is thought that the pull-out stength of the nail will diminish if the difference in diameter is increased substantially above the thickness of the member in which the nail is to grip.

Figure 16:
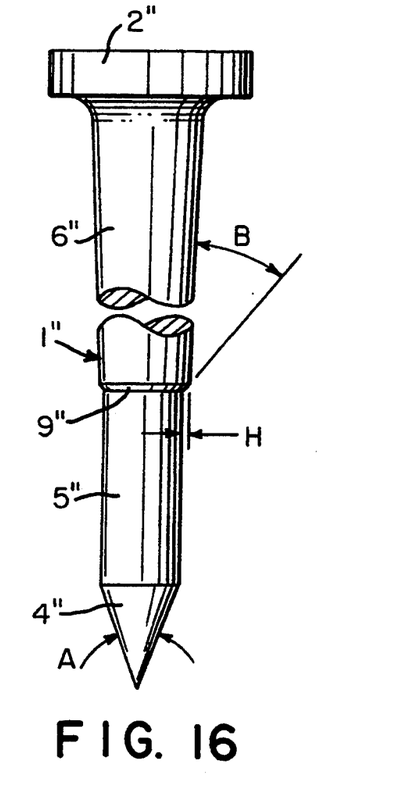
FIG. 16 is a view similar to that of FIGS. 1 and 15, showing however a further embodiment of the present invention wherein the different component parts of the nail are denoted by double-primed (") reference characters.

It is preferred that the gripping portion 6 is of substantially constant cross-sectional size throughout its length, although it could be slightly tapered, particularly over the section immediately adjacent the penetrating portion 5, as shown, for example, in FIG. 16. In the particular arrangement shown, the gripping portion 6 has a substantially constant diameter, and stepped portion or chamfer 9 slopes away from the penetrating portion 5. The angle B (FIG. 1) at which the step 9 slopes can be selected to suit requirements, but an angle of roughly 45° has been found to be satisfactory.

The length of the gripping portion 6 will be selected to suit requirements, but will usually be no less than the combined thicknesses of the cladding 7 and the member 8.

Figure 6:
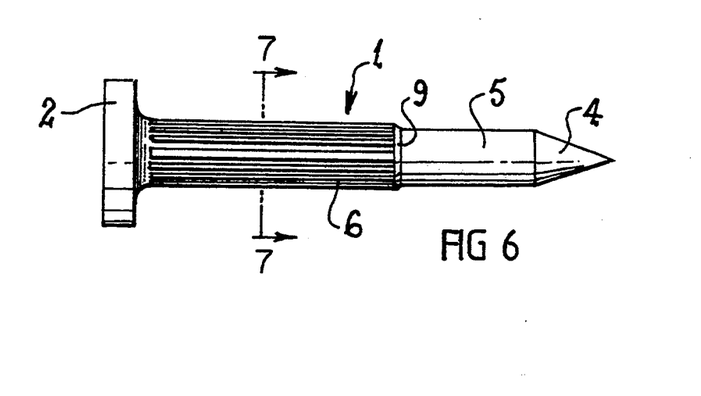
FIG. 6 is a view similar to FIG. 1 but showing another embodiment of the invention.
Figure 7:
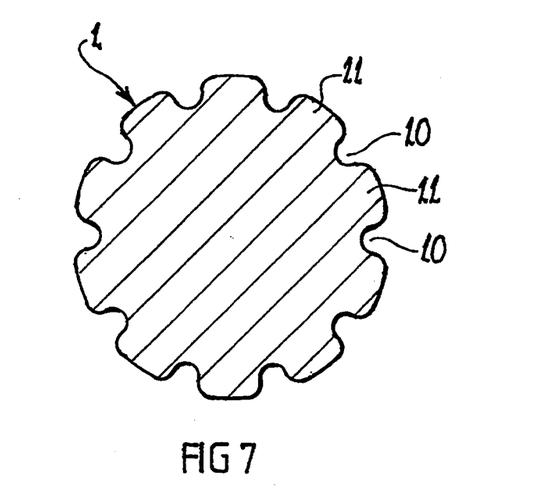
FIG. 7 is an enlarged cross-sectional view taken along line 7—7 of FIG. 6.

It is to be understood that neither of the shank portions 5 and 6 needs to have a smooth surface as is indicated by FIGS. 1 to 4 of the drawings. The surface of either or each of those portions 5 and 6 may be roughened, provided with grooves, or otherwise treated to suit requirements. FIGS. 6 and 7 of the drawings show one such form of treatment in which the surface of the shank portion 6 is provided with a gripping feature in the form of alternating grooves 10 and ribs 11 which extend longitudinally of the shank 1. Such surface treatment may assist in achieving a strong grip with an object into which the nail is driven.

The cross-sectional shape shown by FIG. 7 is an exemplified shape, and is not to be understood as the only shape which may be adopted for a grooved shank. Furthermore, the grooves 10 could be arranged angularly relative to the longitudinal axis of the shank 1 rather than being parallel to that axis as shown. It is also possible to have grooves extending circumferentially of the shank 1, rather than longitudinally thereof. Still further, the grooves 10 need not be continuous, but could be interrupted, and an example of an interrupted arrangement is shown in FIG. 8.

Figure 8:
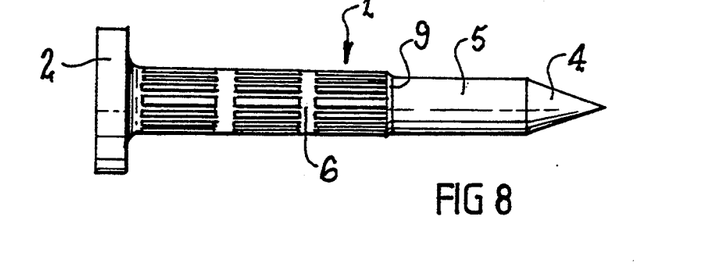
FIG. 8 is a view similar to FIG. 6 but showing still another embodiment of the invention.

Although FIGS. 6 and 8 show the grooves 10 in the gripping portion 6 of the shank 1, it is to be understood that they may be provided also in the penetrating portion 5. Alternatively, they may be provided in the penetrating portion 5 only.

Figure 9:
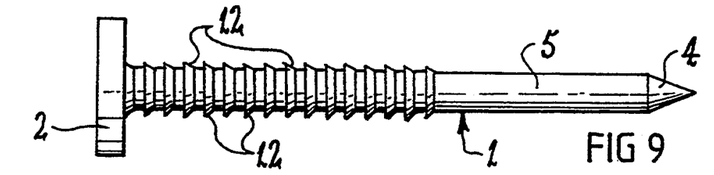
FIG. 9 is a view similar to FIG. 1 showing yet another embodiment of the invention.

FIG. 9 shows another embodiment of the invention in which a series of teeth 12 extend along the gripping portion 6 so as to act as a gripping feature. Each tooth 12 extends circumferentially around the gripping portion 6, and is spaced from each two adjacent teeth 12 in the axial direction of the shank 1. It is to be understood that the teeth 12 may have a form different to that shown in FIG. 9. Also, each tooth 12 need not extend as a continuous ring around the gripping portion 6, but could be divided into two or more circumferentially spaced parts.

Figure 10:
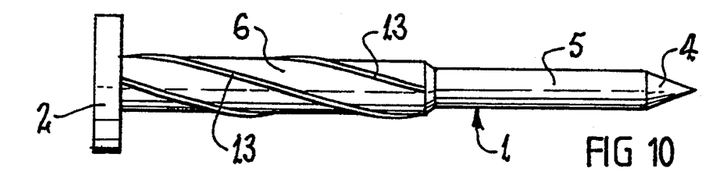
FIG. 10 is a view similar to FIG. 1 showing still another embodiment of the invention.

Still another embodiment is shown by FIG. 10. According to that embodiment, the gripping feature is formed by a series of angularly extending ribs 13 provided on the gripping portion 6. Each rib 13 extends angularly relative to the longitudinal axis of the shank 1 so as to follow a helical path. The angle of the helix can be selected to suit requirements, but an angle within the range 45° to something less than 90° is usually preferred. The number of ribs 13 can be also selected to suit requirements.

Figure 11:
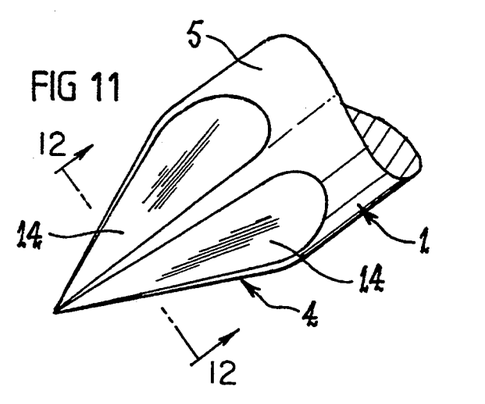
FIG. 11 is a perspective view of a tip portion of a nail according to the invention, wherein the tip is of diamond form.
Figure 12:
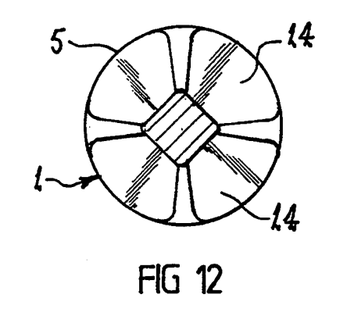
FIG. 12 is a cross-sectional view taken along line 12—12 of FIG. 11.
Figure 13:
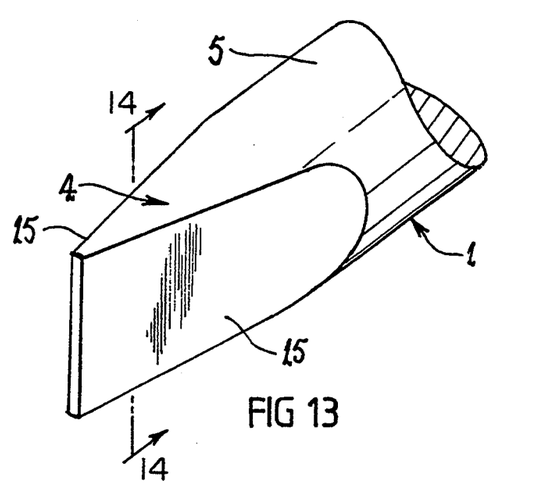
FIG. 13 is a view similar to FIG. 11 but showing a chisel point tip portion.
Figure 14:
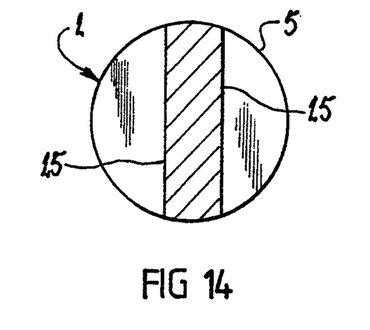
FIG. 14 is a cross-sectional view taken along line 14—14 of FIG. 13.

Each of the embodiments shown in the drawings has a conical tip portion 4. As previously indicated, other forms could be adopted for the tip portion, including a diamond form or a chisel form. FIGS. 11 and 12 show an exemplified diamond form having four flat surfaces 14, each of which is arranged substantially at right-angles to each two adjacent surfaces 14. FIGS. 13 and 14 show an exemplified chisel form having two oppositely facing flat surfaces 15.

According to yet another possible modification of the nail according to the invention, an adhesive may be applied to the gripping portion 6 and arranged to be activated as a consequence of driving that portion 6 into a member. By way of example, the adhesive may be activated by friction generated heat as the nail penetrates a member. Alternatively, the adhesive may be captured in globules which break as the nail is driven into a member and therefore result in spreading of the adhesive. Other arrangements are clearly possible. In each case the intention is to result in automatic exposure of an adhesive which subsequently hardens to assist in maintaining a grip between the nail and the member into which it is driven.

A nail according to the invention has been found to be highly effective for securing cladding to a metal section. In particular, the nail has high pull-out stength when embedded in such a section.

Various alterations, modifications and/or additions may be introduced into the constructions and arrangements of parts previously described without departing from the spirit or ambit of the invention as defined by the appended claims.

Having now now described my invention, what I claim as new and desire to secure by Letters Patent is:

1. A nail, comprising:
   an elongate shank;
   a head provided at one end of said shank;
   a pointed tip portion provided at an opposite end of said shank;
   a substantially smooth penetrating portion of said shank extending from said tip portion to a location intermediate said tip portion and said head, and having a first predetermined diametrical dimension, for cooperating with said tip portion for forming a hole within a member having a first diametrical dimension corresponding to said first predetermined diametrical dimension of said penetrating portion of said shank;
   a substantially smooth gripping portion of said shank extending from said location, intermediate said tip portion and said head, to said head, and having a second predetermined diametrical dimension which is greater than said first predetermined diametrical dimension of said penetrating portion of said shank for enlarging said hole formed within said member by said substantially smooth penetrating portion of said shank and thereby facilitating gripping of said nail within said member; and
   a stepped, chamfered portion disposed at said location intermediate said tip portion and said head for interconnecting said penetrating portion, having said first predetermined diametrical dimension, and said gripping portion, having said second diametrical dimension, in a substantially abrupt manner so as to commence enlargement of said hole, initially formed within said member by said penetrating portion of said shank having said first predetermined diametrical dimension, and for permitting said gripping portion of said shank to complete enlargement of said hole within said member such that said hole formed within said member finally has a second predetermined diametrical dimension which corresponds to said second predetermined diametrical dimension of said gripping portion of said shank whereby said nail is securely gripped within said member as a result of said substantially smooth, gripping portion, having said larger, second diametrical dimension as compared to said smaller, first diametrical dimension of said penetrating portion of said shank, engaging sidewall portions of said member defining said hole within said member.

2. A nail according to claim 1, wherein the cross-sectional size of both said penetrating portion and said gripping portion is substantially constant throughout the actual length of the respective portions.

3. A nail according to claim 1, wherein the cross-sectional size of said gripping portion is not constant along the axial length of that portion, and the smallest cross-sectional size of the gripping portion is greater than the cross-sectional size of the penetrating portion.

4. A nail according to claim 1, wherein the cross-sectional size of said penetrating portion is not constant along the axial length of that portion, and the largest cross-sectional size of the penetrating portion is smaller than the cross-sectional size of the gripping portion.

5. A nail according to claim 1, wherein the cross-sectional shape of both said penetrating portion and said gripping portion is generally circular.

6. A nail according to claim 1, wherein said stepped chamfered portion slopes radially inwardly from said gripping portion towards said tip portion.

7. A nail according to claim 6, wherein in the angle of said slope is approximately 45° relative to the longitudinal axis of said shank.

8. A nail according to claim 1, wherein said tip portion is of substantially conical form.

9. A nail according to claim 8, wherein the included angle of said conical tip portion is within the range 30° to 40° inclusive.

10. A nail according to claim 1, wherein said tip portion is of diamond form having four substantially flat faces.

11. A nail according to claim 1, wherein said tip portion is of chisel form having two substantially flat faces which face in opposite directions.

12. A nail according to claim 1, wherein an adhesive is provided on at least part of said gripping portion, and said adhesive is of a form such as to be inactive during storage of said nail and to be rendered active in response to said gripping portion being driven into a member.

13. An installation, comprising:
   a) a support member having a first predetermined thickness;
   b) a cladding member overlying at least a part of said support member and having a second predetermined thickness; and
   c) at least one nail for securing said cladding member to said support member, said at least one nail comprising:
      i) an elongate shank;
      ii) a head provided at one end of said shank;
      iii) a pointed tip portion provided at an opposite end of said shank;
      iv) a cylindrical penetrating portion of said shank extending from said tip portion to a location intermediate said tip portion and said head, and having a first predetermined diametrical dimension, for cooperating with said pointed tip portion for forming a hole within said support member having a first diametrical dimension corresponding to said first predetermined diametrical dimension of said penetrating portion of said shank;
      v) a cylindrical gripping portion of said shank extending from said location, intermediate said tip portion and said head, to said head, and having a second predetermined diametrical dimension which is greater than said first predetermined diametrical dimension of said penetrating portion of said shank for enlarging said hole formed within said support member by said cylindrical penetrating portion of said shank and thereby facilitating gripping of said nail within said support member; and vi) a stepped, chamfered portion disposed at said location intermediate said tip portion and said head for interconnecting said penetrating portion, having said first predetermined diametrical dimension, and said gripping portion, having said second predetermined diametrical dimension, in a substantially abrupt manner so as to commence enlargement of said hole, initially formed within said support member by said penetrating portion of said shank having said first predetermined diametrical dimension, and for permitting said gripping portion of said shank to complete enlargement of said hole within said support member such that said hole formed within said support member finally has a second predetermined diametrical dimension which corresponds to said second predetermined diametrical dimension of said gripping portion of said shank whereby said nail is securely gripped within said member as a result of said cylindrical gripping portion, having said larger, second diametrical dimension as compared to said smaller, first diametrical dimension of said penetrating portion of said shank, engaging sidewall portions of said support member defining said hole within said support member.

14. An installation according to claim 13, wherein:
the height of said stepped chamfered portion measured radially of said shank is approximately one half the thickness of that part of said support member which is penetrated by said nail.

15. An installation according to claim 13, wherein:
the height of said stepped chamfered portion measured radially of said shank is no greater than one half the thickness of that part of said support member which is penetrated by said nail.

16. An installation according to claim 13, wherein:
the axial length of said penetrating portion of said shank is no less than the thickness of that part of said support member into which said nail is driven.

17. An installation according to claim 16, wherein:
the axial length of said gripping portion of said shank is no less than the combined thicknesses of said cladding member and said support member.

18. A nail, comprising:
an elongate shank;
a head provided at one end of said shank;
a pointed tip portion provided at an opposite end of said shank;
a substantially smooth penetrating portion of said shank extending from said tip portion to a location intermediate said tip portion and said head, and having a first predetermined diametrical dimension, for cooperating with said pointed tip portion for forming a hole within a member having a first diametrical dimension corresponding to said first predetermined diametrical dimension of said penetrating portion of said shank;
a cylindrical gripping portion of said shank extending from said location, intermediate said tip portion and said head, to said head, and having a second predetermined diametrical dimension which is greater than said first predetermined diametrical dimension of said penetrating portion of said shank for enlarging said hole formed within said member by said substantially smooth penetrating portion of said shank and thereby facilitating gripping of said nail within said member;
a plurality of circumferentially spaced, substantially axially extending ribs angularly disposed, upon external surface portions of said cylindrical gripping portion of said shank, relative to the axis of said shank so as to define a plurality of helixes for enhancing said gripping of said nail within said member; and
a stepped, chamfered portion disposed at said location intermediate said tip portion and said head for interconnecting said penetrating portion, having said first predetermined diametrical dimension, and said gripping portion, having said second diametrical dimension, in a substantially abrupt manner so as to commence enlargement of said hole, initially formed within said member by said penetrating portion of said shank having said first predetermined diametrical dimension, and for permitting said gripping portion of said shank, having said plurality of helix-oriented ribs disposed thereon, to complete enlargement of said hole within said member such that said hole formed within said member finally has a second predetermined diametrical dimension which at least corresponds to said second predetermined diametrical dimension of said gripping portion of said shank whereby said nail is securely gripped within said member as a result of said cylindrical gripping portion of said shank, having said larger, second diametrical dimension as compared to said smaller, first diametrical dimension of said penetrating portion of said shank, and having said plurality of helix-oriented ribs disposed thereon, engaging sidewall portions of said member defining said hole within said member.

19. A nail according to claim 18, wherein the angle of said helix relative to said shank axis is in the range of 30° to 60° inclusive.

20. A nail according to claim 19, wherein said angle is substantially 45°.

21. A nail, comprising:
an elongate shank;
a head provided at one end of said shank;
a pointed tip portion provided at an opposite end of said shank;
a substantially smooth penetrating portion of said shank extending from said tip portion to a location intermediate said tip portion and said head, and having a first predetermined diametrical dimension, for cooperating with said pointed tip portion for forming a hole within a member having a first diametrical dimension corresponding to said first predetermined diametrical dimension of said penetrating portion of said shank; and
a cylindrical gripping portion of said shank extending from said location, intermediate said tip portion and said head, to said head, and comprising a plurality of radially outwardly projecting, circumferentially extending, frusto-conical teeth axially spaced apart from each other by means of substantially smooth cylindrical portions of said shank wherein outer peripheral portions of said teeth have a second predetermined diametrical dimension which is greater than said first predetermined diametrical dimension of said penetrating portion of said shank for enlarging said hole formed within said member by said substantially smooth penetrating portion of said shank and thereby facilitating gripping of said nail within said member;

a first one of said frusto-conical teeth of said gripping portion of said shank comprising, in effect, a stepped, chamfered portion disposed at said location intermediate said tip portion and said head for interconnecting said penetrating portion, having said first predetermined diametrical dimension, and said gripping portion, having said second diametrical dimension, in a substantially abrupt manner so as to commence enlargement of said hole, initially formed within said member by said penetrating portion of said shank having said first predetermined diametrical dimension, and for permitting said gripping portion of said shank, comprising said plurality of radially outwardly projecting frusto-conical teeth, to complete enlargement of said hole within said member such that said hole formed within said member finally has a second predetermined diametrical dimension which corresponds to said second predetermined diametrical dimension of said gripping portion of said shank, as defined by said outer peripheral portions of said frusto-conical teeth, whereby said nail is securely gripped within said member as a result of said cylindrical gripping portion of said shank, having said larger, second diametrical dimension as compared to said smaller, first diametrical dimension of said penetrating portion of said shank, and having said plurality of frusto-conical teeth disposed thereon, engaging sidewall portions of said member defining said hole within said member.

22. A nail according to claim 21, wherein:
each of said plurality of circumferentially extending teeth spaced apart in the axial direction of said shank extends circumferentially around said gripping portion of said shank as a continuous ring.

23. A nail, comprising:
an elongate shank;
a head provided at one end of said shank;
a pointed tip portion provided at an opposite end of said shank;
a substantially smooth penetrating portion of said shank extending from said tip portion to a location intermediate said tip portion and said head, and having a first predetermined diametrical dimension, for cooperating with said pointed tip portion for forming a hole within a member having a first diametrical dimension corresponding to said first predetermined diametrical dimension of said penetrating portion of said shank;
a cylindrical gripping portion of said shank extending from said location, intermediate said tip portion and said head, to said head, and having a second predetermined diametrical dimension which is greater than said first predetermined diametrical dimension of said penetrating portion of said shank for enlarging said hole formed within said member by said substantially smooth penetrating portion of said shank and thereby facilitating gripping of said nail within said member;
a plurality of axially extending ribs disposed upon external surface portions of said cylindrical gripping portion of said shank so as to enhance said gripping of said nail within said member; and a stepped, chamfered portion disposed at said location intermediate said tip portion and said head for interconnecting said penetrating portion, having said first predetermined diametrical dimension, and said gripping portion, having said second diametrical dimension, in a substantially abrupt manner so as to commence enlargement of said hole, initially formed within said member by said penetrating portion of said shank having said first predetermined diametrical dimension, and for permitting said gripping portion of said shank, having said plurality of axially extending ribs disposed thereon, to complete enlargement of said hole within said member such that said hole formed within said member finally has a second predetermined diametrical dimension which at least corresponds to said second predetermined diametrical dimension of said gripping portion of said shank whereby said nail is securely gripped within said member as a result of said cylindrical gripping portion of said shank, having said larger, second diametrical dimension as compared to said smaller, first diametrical dimension of said penetrating portion of said shank, and having said plurality of axially extending ribs disposed thereon, engaging sidewall portions of said member defining said hole within said member.

24. A nail as set forth in claim 23, wherein:
said plurality of axially extending ribs are disposed in a series of at least two, axially spaced sets of axially extending ribs.

25. A nail as set forth in claim 24, wherein:
said axially extending ribs are disposed in three axially spaced sets of axially extending ribs.

26. A nail, comprising:
an elongate shank;
a head provided at one end of said shank;
a pointed tip portion provided at an opposite end of said shank;
a cylindrical penetrating portion of said shank extending from said tip portion to a location intermediate said tip portion and said head, and having a first predetermined diametrical dimension, for cooperating with said pointed tip portion for forming a hole within a member having a first diametrical dimension corresponding to said first predetermined diametrical dimension of said penetrating portion of said shank;
a cylindrical gripping portion of said shank extending from said location, intermediate said tip portion and said head, to said head, and having a second predetermined diametrical dimension which is greater than said first predetermined diametrical dimension of said penetrating portion of said shank for enlarging said hole formed within said member by said cylindrical penetrating portion of said shank and thereby facilitating gripping of said nail within said member; and
a stepped, chamfered portion disposed at said location intermediate said tip portion and said head for interconnecting said penetrating portion, having said first predetermined diametrical dimension, and said gripping portion, having said second diametrical dimension, in a substantially abrupt manner so as to commence enlargement of said hole, initially formed within said member by said penetrating portion of said shank having said first predetermined diametrical dimension, and for permitting said gripping portion of said shank to complete enlargement of said hole within said member such that said hole formed within said member finally has a second predetermined diametrical dimension which corresponds to said second predetermined diametrical dimension of said gripping portion of said shank whereby said nail is securely gripped within said member as a result of said cylindrical gripping portion, having said larger, second diametrical dimension as compared to said smaller, first diametrical dimension of said penetrating portion of said shank, engaging sidewall portions of said member defining said hole within said member.

* * * * *